United States Patent
Perkins et al.

(10) Patent No.: US 10,124,886 B2
(45) Date of Patent: Nov. 13, 2018

(54) POWERED AIRCRAFT WHEEL DESIGN

(71) Applicant: Borealis Technical Limited, North Plains, OR (US)

(72) Inventors: Scott Perkins, Kent, WA (US); Isaiah W. Cox, Baltimore, MD (US)

(73) Assignee: Borealis Technical Limited, Gibraltar (GI)

( * ) Notice: Subject to any disclaimer, the term of this patent is extended or adjusted under 35 U.S.C. 154(b) by 180 days.

(21) Appl. No.: 14/513,208

(22) Filed: Oct. 13, 2014

(65) Prior Publication Data

US 2016/0101846 A1    Apr. 14, 2016

(51) Int. Cl.
*B64C 25/40* (2006.01)
*B60B 27/00* (2006.01)
*B60B 25/12* (2006.01)

(52) U.S. Cl.
CPC ............ *B64C 25/405* (2013.01); *B60B 25/12* (2013.01); *B60B 27/0015* (2013.01); *B60B 2360/102* (2013.01); *B60B 2360/104* (2013.01); *B60B 2360/108* (2013.01); *B60B 2900/513* (2013.01); *B60Y 2200/51* (2013.01); *Y02T 50/823* (2013.01)

(58) Field of Classification Search
CPC .... B64C 25/405; B64C 25/34; B60B 2360/10
See application file for complete search history.

(56) References Cited

U.S. PATENT DOCUMENTS

| | | | |
|---|---|---|---|
| 5,018,795 A | 5/1991 | Engerand et al. | |
| 6,657,334 B1 | 12/2003 | Edelson | |
| 6,838,791 B2 | 1/2005 | Edelson | |
| 7,116,019 B2 | 10/2006 | Edelson | |
| 7,445,178 B2 | 11/2008 | McCoskey et al. | |
| 7,469,858 B2 | 12/2008 | Edelson | |
| 8,714,481 B2 * | 5/2014 | Sweet | B64C 25/405 244/100 R |
| 8,833,694 B2 * | 9/2014 | Gilleran | B64C 25/405 188/65.1 |
| 2010/0001130 A1 | 1/2010 | Steinke et al. | |

(Continued)

FOREIGN PATENT DOCUMENTS

FR        003022186 A1 * 12/2015
WO    WO 2014029665 A1 *  2/2014  ............. B60B 3/041

OTHER PUBLICATIONS

Terence Bell, Common Steel Alloying Agents Properties and Effects, Nov. 2016, https://www.thebalance.com/common-steel-alloying-agents-properties-and-effects-2340004.*

(Continued)

*Primary Examiner* — Magdalena Topolski

(57) ABSTRACT

A powered aircraft wheel is designed to include multiple wheel sections configured to define a cavity within the wheel and to support completely within the wheel cavity an onboard non-engine drive means controllable to move an aircraft autonomously without reliance on aircraft engines during taxi and ground travel. Each part of the powered wheel may be constructed of a material specifically selected to emphasize a functional property of the material that is optimal for the function of the wheel part at a specific location. The selected combination of functionally distinct materials gives the powered aircraft wheel a unique optimal structural and functional capability.

5 Claims, 2 Drawing Sheets

(56) References Cited

U.S. PATENT DOCUMENTS

| | | | |
|---|---|---|---|
| 2011/0089289 A1 | 4/2011 | Wilson | |
| 2011/0297786 A1* | 12/2011 | Sweet | B64C 25/405 |
| | | | 244/103 R |
| 2012/0001018 A1* | 1/2012 | Gilleran | B64C 25/405 |
| | | | 244/50 |
| 2012/0091785 A1* | 4/2012 | Lara, Sr. | B60B 3/008 |
| | | | 301/111.04 |
| 2013/0056580 A1* | 3/2013 | Gilleran | B64C 25/405 |
| | | | 244/50 |
| 2013/0257139 A1* | 10/2013 | Goto | B60B 3/005 |
| | | | 301/64.101 |
| 2015/0159968 A1* | 6/2015 | Edelson | B64C 25/405 |
| | | | 301/6.2 |

OTHER PUBLICATIONS

"Types of Titanium Alloys" https://titaniumprocessingcenter.com/the-element-titanium/.*

* cited by examiner

POWERED AIRCRAFT WHEEL DESIGN

TECHNICAL FIELD

The present invention relates generally to aircraft wheels and specifically to the design and construction of an aircraft wheel powered by onboard non-engine drive means to move an aircraft autonomously on the ground.

BACKGROUND OF THE INVENTION

Aircraft wheels are currently designed primarily in response to requirements for accommodating selected tires as well as housing an aircraft's brakes and supporting the aircraft on ground surfaces. A goal is to accomplish these functions with a wheel design that adds a minimum amount of weight to the aircraft while maximizing wheel operational life. Aircraft wheels not only help support the aircraft's weight during taxi, but, along with other landing gear structures, are required to absorb significant loads when an aircraft lands. The conditions under which aircraft wheels must operate during service, moreover, may be harsh and demanding. Aircraft wheels typically experience not only high energy braking events that can produce significant heat, but are also exposed to carbon dust from the application of carbon brakes and to fluids from runways and aircraft. Consequently, the United States Federal Aviation Administration (FAA) and corresponding international aircraft regulatory bodies require that each aircraft main and nose landing gear wheel be submitted for approval prior to use on an aircraft. The FAA reviews such factors as maximum static and limit load ratings of each wheel, taking into consideration design maximum weight and critical center of gravity. The maximum limit load rating, for example, must equal or exceed the maximum radial limit load determined under applicable ground load requirements of the wheel. Additional requirements apply to the approval of wheels with brakes.

Various wheel configurations are available that have been designed to meet these requirements. A wheel configuration known as an A-frame design, while structurally efficient and light in weight, provides limited space for brakes or other structures. Another type of wheel configuration known as a bowl-type design provides the space needed for aircraft brakes, but is heavier than the A-frame wheel. For large aircraft with high brake energy and heat sink requirements, however, a bowl-type wheel, although it may increase the aircraft's weight, may meet these needs.

The vast majority of aircraft wheels are made of forged aluminum alloys. Some steel and magnesium alloys previously used to make wheels are heavier than aluminum and may, in addition, present corrosion challenges. Titanium has been proposed for aircraft wheels, but has not been found to be a practical substitute for aluminum alloys. The cost of making aircraft wheels from titanium has been found to be significantly higher than the cost of making aircraft wheels from aluminum. One comparison of aircraft wheel assembly unit weight, however, found an aircraft wheel assembly made of titanium to have a low weight advantage over both forged and cast aluminum. Because aircraft wheels are among the most highly stressed parts of an aircraft and the complete failure of an aircraft wheel can be catastrophic, the material selected to form an aircraft wheel must be able to withstand any loads and stresses to which the wheel is likely to be subjected. One material that has been proposed for this purpose is Aluminum Alloy 2040, which has a relative composition of Al-5, Cu-0.8, Mg-0.6, Mn-0.5, Ag-0.122.

The prior art has proposed different approaches to aircraft wheel design and materials to reduce weight while maintaining the requisite strength to sustain loads encountered during operation. In U.S. Patent Application Publication No. US2010/0001130, for example, Steinke et al describe a hybrid aircraft wheel in which a wheel section with a rim flange is formed of an epoxy resin composite reinforced with carbon fibers and metal. This construction is stated to be lighter than aluminum and strong enough for aircraft applications, including a nose wheel or a non-braked main wheel. In U.S. Pat. No. 5,018,795, Engerand et al describe an aircraft wheel formed of both metal and a composite material made with high strength carbon fibers bonded by an organic resin designed with a removable beading mounted by a titanium mounting belt. This arrangement is stated to have sufficient strength to withstand stresses to which aircraft wheels are subjected as well as to permit a tire to be mounted easily on the wheel. Using combinations of metals with functional characteristics selected to correspond to specific wheel section functions is not suggested.

Providing motors and other drive devices to move aircraft independently on the ground without reliance on the aircraft's main engines or tow vehicles is known. Such motors and drive devices may be installed in aircraft wheels to drive or power the wheels and thereby move the aircraft during taxi. In U.S. Pat. No. 7,445,178, for example, McCoskey et al describe a powered nose aircraft wheel system with a traction motor mounted partially in an A-frame type wheel that rotates the wheel to drive the aircraft on the ground. Wilson, in U.S. Patent Application Publication No. US2011/0089289, describes mounting an electric motor in a two-part bowl-type aircraft main wheel in space normally occupied by brakes to drive the aircraft during taxi. An alternate brake location may be required with this design. Neither McCoskey et al nor Wilson, however, is concerned with optimizing wheel design or operation, and neither includes any reference to or description of materials used to make the disclosed drive wheel designs.

A need exists, therefore, for an aircraft wheel powered by non-engine drive means for autonomous aircraft ground movement in which design, construction, and functional properties of materials are selected to optimize operation of the wheel to support and move the aircraft on a ground surface.

SUMMARY OF THE INVENTION

It is a primary object of the present invention, therefore, to overcome the deficiencies of the prior art and to provide a powered aircraft wheel with design, construction, and functional properties of materials selected to optimize operation of the powered wheel to move an aircraft autonomously during taxi.

It is another object of the present invention to provide a wheel design for an aircraft equipped with one or more onboard non-engine drive means controllable to power the wheel and move the aircraft autonomously without reliance on aircraft engines during ground travel that incorporates the non-engine drive means completely within the dimensions of the wheel.

It is an additional object of the present invention to provide a wheel design for an aircraft equipped with one or more onboard non-engine drive means controllable to power the wheel and move the aircraft autonomously on ground surfaces that is constructed of materials selected to optimize wheel performance.

It is a further object of the present invention to provide an aircraft powered wheel constructed of materials with selected functional properties designed to optimize wheel performance during aircraft ground movement.

The aforesaid objects are met by providing a powered aircraft wheel designed to include multiple wheel sections to support completely within the wheel onboard non-engine drive means controllable to move the aircraft autonomously without reliance on aircraft engines during ground travel. Each part of the wheel is constructed of a material specifically selected to emphasize a specific functional property of the material. The selected combination of functionally selected materials gives the powered aircraft wheel of the present invention a unique optimal structural and functional capability not heretofore possible.

Other objects and advantages will be apparent from the following description, drawings, and claims.

DESCRIPTION OF THE INVENTION

The present invention provides an aircraft wheel designed and constructed to produce an optimal wheel structure and to promote optimal wheel function when it is powered by an aircraft onboard non-engine drive means capable of driving an aircraft autonomously on the ground without reliance on the aircraft's main engines or external tow vehicles. The use of the term "powered wheel" herein is intended to encompass such a non-engine driven wheel. Aircraft with one or more powered wheels are equipped with onboard non-engine drive means that are controllable to drive the one or more wheels and move the aircraft during taxi and travel on ground surfaces. Although an onboard drive means may be located in another onboard aircraft location and may be drivingly connected to power an aircraft wheel, the wheel design of the present invention contemplates the location of a drive means substantially within an aircraft wheel as shown and described herein. One or more non-engine drive means may be located within in one or more nose landing gear or main landing gear wheels to power the wheel or wheels in which it is mounted.

The term "non-engine drive means" as used herein refers to any drive means that may be useful for powering or driving an aircraft wheel, other than aircraft main engines, to move an aircraft on a ground surface, including but not limited to electric, hydraulic and pneumatic drive means or motors. A particularly preferred drive means is a high phase order electric motor of the type described in U.S. Pat. Nos. 6,657,334; 6,838,791; 7,116,019; and 7,469,858, all of which are owned in common with the present invention. A geared motor, such as that shown and described in commonly owned U.S. Pat. No. 7,469,858, is designed to produce the torque required to move a commercial sized aircraft at an optimal speed for ground movement. The disclosures of the aforementioned patents are incorporated herein by reference. The electric power for an electric drive means is preferably supplied by the aircraft auxiliary power unit (APU), but may also be supplied by any alternative source of electric power.

When one of the electric motors or other drive means described above is located completely within the dimensions of an aircraft wheel, it can generate heat during operation as the wheel is powered to move the aircraft during taxi, and this heat must be dissipated. Further, the additional weight added by the motor must be supported by the wheel structures during aircraft ground movement and at other times. The wheel design and construction of the present invention meets both of these requirements.

Figure 1:
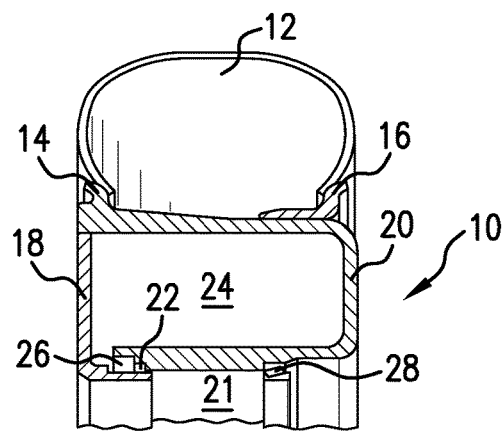
FIG. 1 is a diagram of a cross section of a portion of one configuration of a powered aircraft wheel in accordance with the present invention showing a tire mounted on the wheel.

Referring to the drawings, FIG. 1 shows a cross-sectional view of a portion of an aircraft landing gear wheel 10 with a tire 12 mounted on the wheel. The tire 12 may be held in place by tire flanges 14 and 16. Tire flange 16 may be demountable to facilitate tire changes. The wheel 10 of FIG. 1 is a two-part wheel. In this design, wheel part 18, which forms an inboard wheel section closest to a landing gear strut (not shown), may be smaller than the wheel part 20, which forms an outboard wheel section, which is outboard of the landing gear strut. Tire flange 14 may be formed integrally with a section of the inboard wheel section 20 adjacent to the tire 12. The two wheel parts 18 and 20 may be fastened together, preferably by one or more nuts and bolts 22 or equivalent fasteners to define a cavity 24 that is completely within the inboard and outboard dimensions of the wheel 10. A drive means, shown in FIGS. 2 and 3, will preferably be located substantially entirely within the cavity 24. Suitable bearings 26 and 28 may be provided, preferably at least where wheel parts 18 and 20 are connected by fastener 22 and where wheel part 20 contacts an axle 21 rotatably mounting the wheel, as shown more clearly in the embodiments of the present invention in FIGS. 2 and 3.

Figure 2:
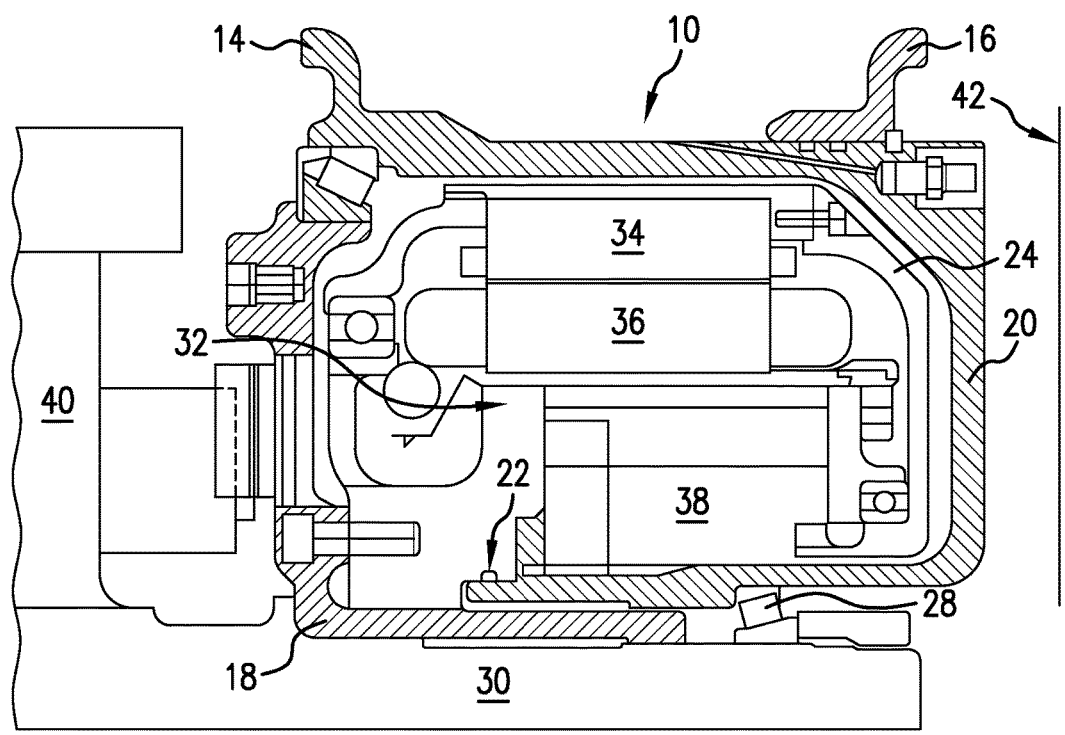
FIG. 2 is a diagram of a cross section of a two-part powered aircraft wheel constructed according to the present invention.

FIG. 2 also shows a two-part wheel 10 with a slightly different configuration and in more detail than the two-part wheel shown in FIG. 1. The wheel is shown rotatably supported on an axle 30. The cavity 24 defined within the dimensions of the wheel may include components of a drive means 32, in this case a rotor 34, a stator 36, and a gear assembly 38, which are mounted completely within the wheel cavity 24. The wheel 10 extends axially from a landing gear piston 40 to a wheel well opening represented by line 42.

It has been determined that constructing each of the main parts of the two-part wheel 10 shown in FIGS. 1 and 2 of a different material that emphasizes selected different functional characteristics of each material can optimize the operation of a powered wheel. Preferably, one material should be selected to provide sufficient stiffness or structural integrity and strength to support not only the drive means or motor powering the wheel and associated structures, but should also be able to withstand the loads and stresses to which landing gear wheels are subjected upon landing of an aircraft and during subsequent ground movement. Additionally, another material may be selected to provide optimum thermal conductivity so that heat produced by the drive means or motor may be transferred to any wheel parts made of this material and away from the drive means and other wheel sections.

In a two-part wheel, such as that shown in FIGS. 1 and 2, the outboard wheel section 20, which should be stiff, may be made of a material selected primarily for stiffness, such as, for example, steel or titanium. The inboard wheel section 18 may preferably be made of a material selected primarily for optimal desired heat conductivity, such as, for example, aluminum. Examples of suitable materials that may be used to make the wheel sections 18 and 20 include the aluminum alloy 2040 described above, high strength steel alloys formulated for aerospace applications, including, for example, the nickel-cobalt steel alloys AF1410 and AerMet® 100, and any of the various titanium alloys developed for use in aircraft landing gear components, such as, for example without limitation, beta alloys Ti-10V-2Fe-3Al and Ti-3Al-8V-6Cr-4Zr-4Mo and alpha-beta alloy Ti-6Al-4V. These materials are exemplary, and any other materials and/or composite materials able to perform the desired functions within the operating parameters for aircraft wheel applications may also be used and are contemplated to be within the scope of the present invention.

The metal alloys presently used to make aircraft landing gear wheels are typically chosen for their strength at ambient and elevated temperatures, corrosion resistance, low density and weight properties, and high fatigue behavior fracture resistance. In a powered aircraft wheel in accordance with the present invention, a material or materials may be selected for each section or part of the powered aircraft wheel that generally has all of the foregoing desirable characteristics. Additionally, materials are further selected that have specifically desirable functional properties for use in forming selected sections or parts of the aircraft wheel. Therefore, wheel materials with several important functional properties may be selected so that a given desired functional property of one material, such as stiffness, may be emphasized more in one wheel location, and another desired functional property of another material, such as thermal conductivity, may be emphasized more in another wheel location.

Figure 3:
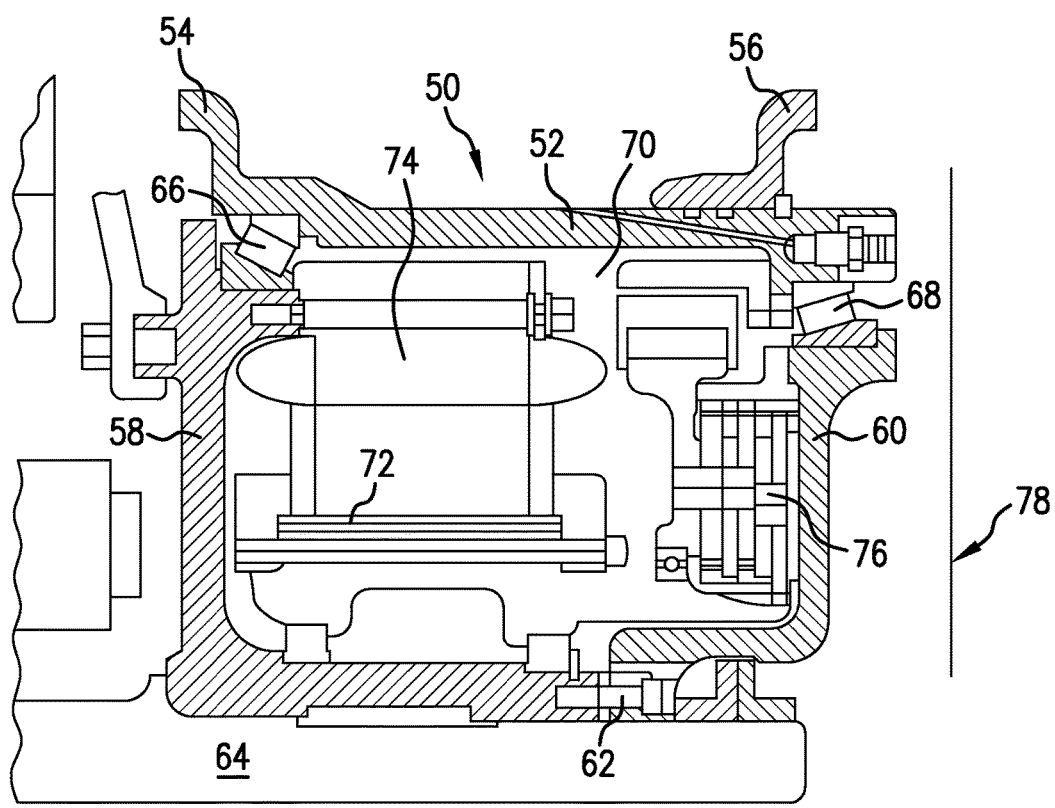
FIG. 3 is a diagram of a cross section of a three-part powered aircraft wheel constructed according to the present invention.

The aircraft wheel construction of the present invention may also be used effectively to optimize the performance of aircraft wheels with virtually any number of parts, including but not limited to three-part and four-part powered aircraft wheels. A three-part aircraft wheel 50 is shown in FIG. 3. A first axial wheel section 52 may support a tire (not shown) and may include an integral tire flange 54 and a demountable tire flange 56. An inboard wheel section 58 may be secured to an outboard wheel section 60, preferably by a nut and bolt 62 or other appropriate fastener adjacent to a wheel axle 64. The axial wheel section 52 may be supported on the inboard wheel section 58 and the outboard wheel section 60 by respective inboard and outboard bearings 66 and 68 to define a cavity 70. Drive means or motor components, including, for example, a stator 72, a rotor 74, and gear assembly 76, are located completely within the cavity 70. The line 78 represents an aircraft wheel well opening. In this wheel design, the outboard wheel section 60, like the outboard wheel section 20 of FIGS. 1 and 2, requires stiffness and may preferably be formed of steel, titanium, or the like. The inboard wheel section 58, like the corresponding inboard wheel section 18 in the two-part wheel of FIGS. 1 and 2, may preferably be formed of aluminum or a material with equivalent thermal conductivity. The wheel 50 tire supporting axial section 52 may be formed of either steel or titanium for stiffness or aluminum for heat conductivity.

As discussed above, it is contemplated that the terms steel, titanium, and aluminum, as used herein, also include alloys of these materials, as well as all other materials that may be suitable for use in aircraft wheel applications that may have the desired stiffness and thermal conductivity characteristics for aircraft wheel applications. Any material with functional properties that may enable it to function with the strength at ambient and elevated temperatures, corrosion resistance, density, and fatigue behavior fracture resistance required for optimal performance in aircraft wheel environments may be used to form aircraft wheel parts based on selected desired functional properties of the material in a specific wheel location.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability where it is desired to optimize the performance of powered aircraft wheels to drive aircraft equipped with drive means for powering such wheels autonomously during taxi and other ground movement.

The invention claimed is:

1. An improved aircraft landing gear drive wheel constructed to functionally and structurally support a non-engine drive motor mounted within the landing gear drive wheel during operation of the non-engine drive motor to drive an aircraft autonomously during ground travel without reliance on aircraft engines and tow vehicles and to withstand landing and non-engine drive motor-powered ground travel loads on the drive wheel, comprising:
   a. said drive wheel supported on an axle of an aircraft nose or main landing gear comprising multiple wheel sections formed of multiple materials connected to define a cavity within said multiple wheel sections;
   b. said non-engine drive motor comprising an electric drive motor that adds weight to said drive wheel and generates heat during operation of said non-engine drive motor to power said drive wheel and drive said aircraft autonomously during ground travel without reliance on aircraft engines and tow vehicles supported completely within said drive wheel defined cavity;
   c. said multiple wheel sections defining said drive wheel cavity comprising at least two wheel sections connected by bearing elements to support said non-engine drive motor completely within dimensions of said defined drive wheel cavity, wherein one of said at least two wheel sections is located adjacent to a strut and said axle of said aircraft nose or main landing gear to form a heat transfer wheel section of said drive wheel, a second one of said at least two wheel sections is spaced outwardly along said axle from said one wheel section to form a structural support and load-withstanding wheel section of said drive wheel, and said non-engine drive motor is positioned within said drive wheel defined cavity to be in heat transfer relationship with said heat transfer wheel section; and
   d. said multiple materials forming said multiple wheel sections comprise a heat transfer material forming said heat transfer wheel section and a fatigue behavior resistant material forming said structural support and load-withstanding wheel section, wherein said heat transfer material comprises an aluminum alloy characterized by thermal conductivity characteristics effective to transfer heat generated away from said non-engine drive motor and from others of said multiple wheel sections to said heat transfer wheel section, and said fatigue behavior resistant material comprises a titanium alloy or a steel alloy characterized by stiffness, structural integrity, and fatigue behavior fracture resistance effective to support the weight added to said drive wheel by said non-engine drive motor and to withstand loads on said drive wheel during operation of said non-engine drive motor to power said drive wheel and drive said aircraft during ground travel and landing.

2. The improved aircraft landing gear drive wheel of claim 1, wherein said heat transfer material forming said heat transfer wheel section comprises Aluminum Alloy 2040 with a relative composition of Al-5, Cu-0.8, Mg-0.6, Ag-0.122, and said fatigue behavior resistant material forming said structural support and load-withstanding wheel section comprises a beta alloy of titanium with a relative composition of Ti-10V-2Fe-3Al or Ti-3Al-8V-6Cr-4Zr-4Mo or an alpha beta alloy of titanium with a relative composition of Ti-6Al-4V.

3. The improved aircraft landing gear drive wheel of claim 1, wherein said fatigue behavior resistant material forming said structural support and load-withstanding wheel section comprises a nickel-cobalt-steel alloy, and said heat transfer material forming said heat transfer wheel section comprises Aluminum Alloy 2040 with a relative composition of Al-5, Cu-0.8, Mg-0.6, Ag-0.122.

4. The improved aircraft landing gear drive wheel of claim 1, wherein said multiple wheel sections defining said drive wheel cavity further comprise a separate third wheel section spaced outwardly of said axle adjacent to a tire mounted on said drive wheel, and said separate third wheel section comprises an additional heat transfer wheel section formed of a heat transfer material comprising said aluminum alloy characterized by thermal conductivity characteristics effective to transfer heat generated away from said non-engine drive motor and away from others of said multiple wheel sections.

5. The improved aircraft landing gear drive wheel of claim 1, wherein said multiple wheel sections defining said drive wheel cavity further comprise a separate third wheel section spaced outwardly of said axle adjacent to a tire mounted on said drive wheel, and said separate third wheel section comprises an additional fatigue behavior resistant wheel section formed of a fatigue behavior resistant material comprising said titanium alloy or said steel alloy characterized by stiffness, structural integrity, and fatigue behavior fracture resistance effective to support the weight added to said drive wheel by said non-engine drive motor and to withstand loads on said drive wheel during operation of said non-engine drive motor to power said drive wheel and drive said aircraft during ground travel and landing.

* * * * *